(12) United States Patent
Patel et al.

(10) Patent No.: US 10,841,094 B2
(45) Date of Patent: Nov. 17, 2020

(54) PRIVATE AND PUBLIC MEDIA DATA IN A DECENTRALIZED SYSTEM

(71) Applicant: MICROSOFT TECHNOLOGY LICENSING, LLC, Redmond, WA (US)

(72) Inventors: Ankur Patel, Sammamish, WA (US); Steven Ball, Redmond, WA (US); Brandon Murdoch, Reading (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 252 days.

(21) Appl. No.: 16/132,155

(22) Filed: Sep. 14, 2018

(65) Prior Publication Data

US 2020/0092292 A1 Mar. 19, 2020

(51) Int. Cl.
*H04L 9/32* (2006.01)
*G06F 21/60* (2013.01)
*H04L 9/06* (2006.01)
*H04L 29/06* (2006.01)

(52) U.S. Cl.
CPC .............. *H04L 9/32* (2013.01); *G06F 21/602* (2013.01); *H04L 9/0637* (2013.01); *H04L 63/102* (2013.01)

(58) Field of Classification Search
CPC ........................................................ H04L 9/32
See application file for complete search history.

(56) References Cited

U.S. PATENT DOCUMENTS

| 10,635,790 B2 * | 4/2020 | Collin ..................... G06F 21/30 |
| 2007/0288560 A1 | 12/2007 | Bou-ghannam et al. |
| 2018/0068097 A1 * | 3/2018 | Collin ................. H04L 63/0892 |
| 2018/0173203 A1 * | 6/2018 | Freer ....................... G06F 21/62 |

(Continued)

FOREIGN PATENT DOCUMENTS

CN 108306819 A 7/2018

OTHER PUBLICATIONS

Jamsrandorj, Uurtsaikh, "Decentralized Access Control Using Blockchain", A Thesis Submitted for the Partial Fulfillment of the Requirements for the Degree of Master of Science, Department of Computer Science, University of Saskatchewan, Aug. 31, 2017, pp. 1-78.

(Continued)

*Primary Examiner* — Bradley W Holder
(74) *Attorney, Agent, or Firm* — Workman Nydegger

(57) ABSTRACT

Inserting media data into existing media data in a way that ensures the inserted data is not accessible to all users. The computing system and methods are implemented in a decentralized network that implements a distributed ledger, the distributed ledger backing one or more decentralized identities (DID) for one or more users of the computing system. Access to a first portion of media data is granted to various users. The access is partially based on a DID that is associated with each of the users. A second portion of media data is received that is inserted into the first portion of media data. The second portion of media data is accessible by only some of the users who have access to the first portion of media data. Access to the second portion of media data is also partially based on the DID of each of the subset of users.

16 Claims, 12 Drawing Sheets

(56) References Cited

U.S. PATENT DOCUMENTS

| | | | |
|---|---|---|---|
| 2018/0234433 A1 | 8/2018 | Oberhauser et al. | |
| 2018/0285996 A1* | 10/2018 | Ma | H04L 9/12 |
| 2019/0096021 A1* | 3/2019 | Jarvis | G06F 21/34 |
| 2019/0108362 A1* | 4/2019 | Miller | G06Q 20/382 |
| 2020/0034833 A1* | 1/2020 | Collen | G06Q 50/06 |
| 2020/0034945 A1* | 1/2020 | Soundararajan | G06F 21/64 |
| 2020/0213110 A1* | 7/2020 | Cage | H04L 63/083 |

OTHER PUBLICATIONS

"International Search Report and Written Opinion Issued in PCT Application No. PCT/US2019/039651", dated Oct. 8, 2019, 11 Pages. (MS# 404989-WO-PCT).

* cited by examiner

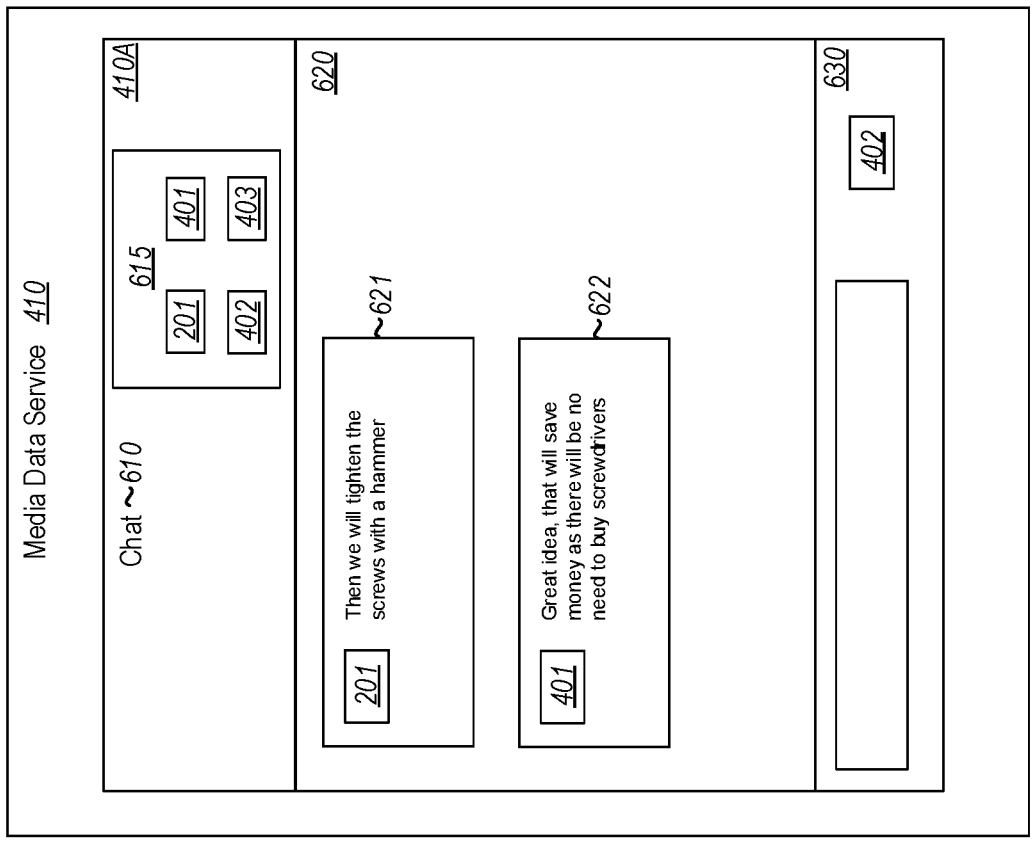

PRIVATE AND PUBLIC MEDIA DATA IN A DECENTRALIZED SYSTEM

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, and methods for inserting media data into existing media data in a way that ensures the inserted data is not accessible to all users. The computing system and methods are implemented in a decentralized network that implements a distributed ledger, the distributed ledger being configured to back one or more decentralized identities (DID) for one or more users of the computing system. Access to a first portion of media data is granted to a various users. The access is partially based on a DID that is associated with each of the users. A second portion of media data is received that is inserted into the first portion of media data. The second portion of media data is accessible by only some of the users who have access to the first portion of media data. Access to the second portion of media data is also partially based on the DID of each of the subset of users.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 6A-6D illustrate an alternative example of the embodiment of FIG. 4;

DETAILED DESCRIPTION

Embodiments disclosed herein are related to computing systems, and methods for inserting media data into existing media data in a way that ensures the inserted data is not accessible to all users. The computing system and methods are implemented in a decentralized network that implements a distributed ledger, the distributed ledger being configured to back one or more decentralized identities (DID) for one or more users of the computing system. Access to a first portion of media data is granted to a various users. The access is partially based on a DID that is associated with each of the users. A second portion of media data is received that is inserted into the first portion of media data. The second portion of media data is accessible by only some of the users who have access to the first portion of media data. Access to the second portion of media data is also partially based on the DID of each of the subset of users.

The embodiments disclosed herein provide a technical advance over conventional systems which do not utilize a distributed network that uses decentralized identifiers. In addition, embodiments disclosed herein allow a user to insert media data into existing media data in a way that it is only accessible to certain other users. In addition, the inserted media data may remain in-line with the existing media data. This enhances usability by the user since he or she can quickly select the desired media data, may have an easier time viewing the inserted data, and may also reserve computing system bandwidth.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
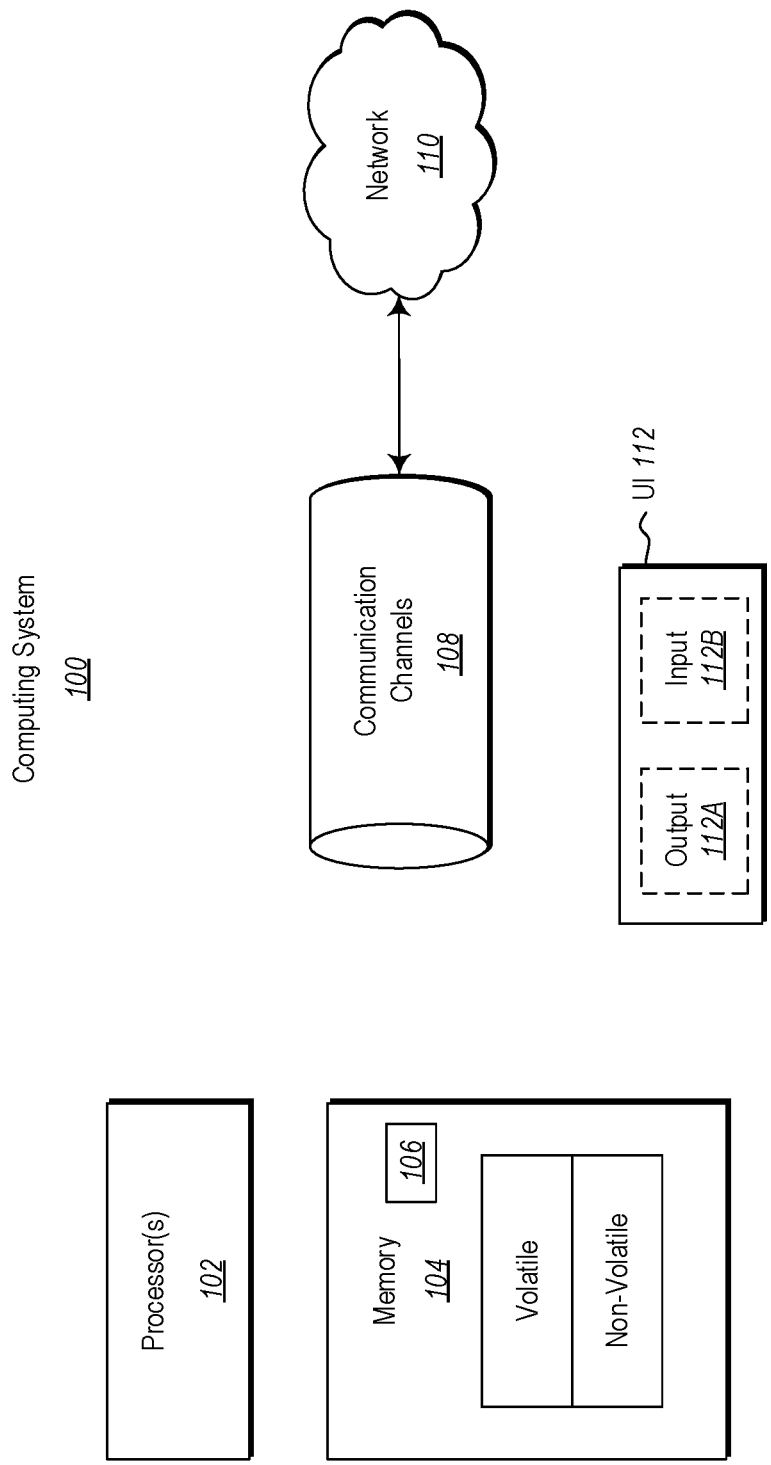
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
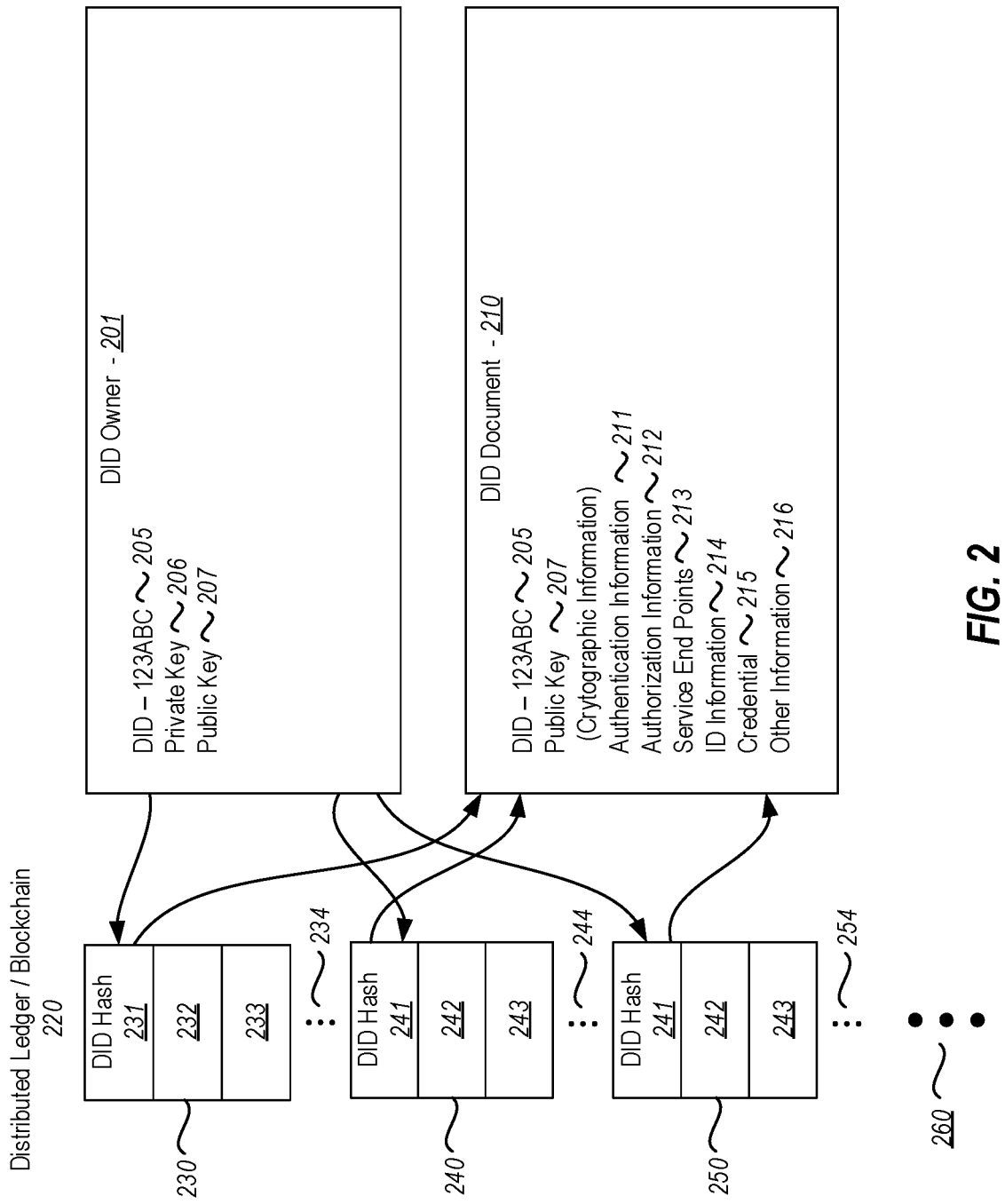
FIG. 2 illustrates an example environment for creating a Decentralized Identification (DID)

Some introductory discussion of a decentralized identification (DID) and the environment is which they are created and reside will now be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource Identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein) Accordingly, the DID 205 may be any identifier that is under the control of the DID owner 201 and independent of any centralized authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. Thus, the private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child in no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger or blockchain 220. The distributed ledger or blockchain 220 thus records that the DID 205 now exits. Since the distributed ledger or blockchain 220 is decentralized, the DID 205 is not under the control of any entity outside of the DID owner 201. The DID hash 231, DID hash 241, and DID hash 251 may include, in addition to the pointer to the DID document 210, a record or time stamp that specifies when the DID 205 was created. At a later date when modifications are made to the DID document 210, this may also be recorded in DID hash 231, DID hash 241, and DID hash 251. The DID hash 231, DID hash 241, and DID hash 251 may further include a copy of the public key 207 so that the DID 205 is cryptographically bound to the DID document 210.

Figure 3:
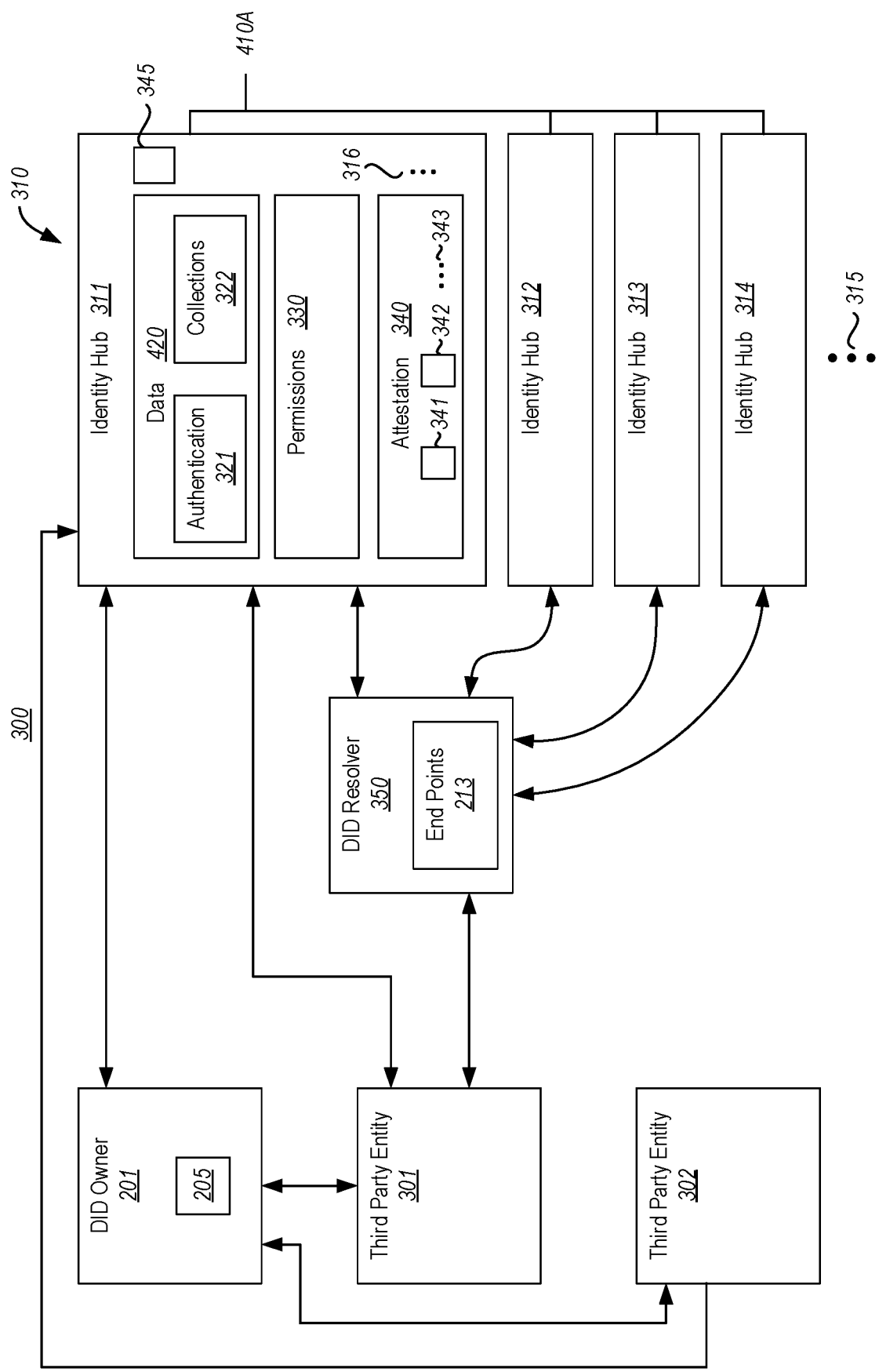
FIG. 3 illustrates an example environment for various DID lifecycle management operations and services.

FIG. 3 illustrates an embodiment of an environment 300 in which a DID such as DID 205 may be utilized. Specifically, the environment 300 will be used to describe the use of the DID 205 in relation to one or more decentralized storage devices or identity hubs. It will be noted that FIG. 3 may include references to elements first discussed in relation to FIG. 2 and thus use the same reference numeral for ease of explanation.

As illustrated in FIG. 3, the environment 300 includes various storage devices or identity hubs 310 that are associated with the DID owner 201. For example, the storage devices or identity hubs 410 may include a first identity hub 311, a second identity hub 312, a third identity hub 313, and a fourth identity hub 314. The ellipses 315 represent that that there may be any number of additional storage devices or identity hubs as circumstances warrant. It will be noted that the identity hubs 310 are considered to be decentralized storage devices in that, as will be explained in more detail to follow, the identity hubs are addressable through use of the DID 205 and its corresponding DID document 210. In addition, although the identity hubs may be hosted by a third party, all access to the identity hubs is based on permissions determined by the DID owner 201.

In one embodiment, the first identity hub 311 may be implemented at a first cloud storage provider, the second identity hub 312 may be implemented at a second cloud storage provider, the third identity hub 313 may be implemented as part of home computing system, and the fourth identity hub 314 may be implemented as part of a mobile device. Thus, the various identity hubs 310 may be implemented across different service providers such as the two different cloud storage providers. Further, the various identity hubs 310 may be implemented as a combination of storage provided by third parties such as the two cloud storage providers and memory devices owned by DID owner 201 such as the home computing system and mobile device. Of course, the various identity hubs 310 may be implemented as other storage devices and services as circumstances warrant.

In one embodiment, the identity hubs 310 may be multiple instances of the same identity hub. This is represented by the line 310A. Thus, the various identity hubs 310 may include at least some of the same data and services. Accordingly, if any change is made to one of the identity hubs 310, the change may be reflected in the remaining identity hubs. For example, the first identity hub 311 and second identity hub 412 are implemented in cloud storage and thus may be able to hold a large amount of data. Accordingly, a full set of the data may be stored in these identity hubs. However, the identity hubs 312 and 313 may have less memory space. Accordingly, in these identity hubs a descriptor of the data stored in the first and second identity hubs may be included. Alternatively, a record of changes made to the data in other identity hubs may be included. Thus, changes in one of the identity hubs 310 are either fully replicated in the other identity hubs or at least a record or descriptor of that data is recorded in the other identity hubs.

Because the identity hubs may be multiple instances of the same identity hub, only a full description of the first identity hub 311 will provided as this description may also apply to the identity hubs 312-315. As illustrated, identity hub 311 may include data storage 320. The data storage 320 may be used to store any type of data that is associated with the DID owner 201. In one embodiment the data may be a collection 322 of a specific type of data corresponding to a specific protocol. For example, the collection 322 may be medical records data that corresponds to a specific protocol for medical data. The collection 322 may be any other type of data.

In one embodiment, the stored data may have different authentication and privacy settings 321 associated with the stored data. For example, a first subset of the data may have a setting 321 that allows the data to be publically exposed, but that does not include any authentication to the DID owner 201. This type of data may be for relatively unimportant data such as color schemes and the like. A second subset of the data may have a setting 321 that that allows the data to be publically exposed and that includes authentication to the DID owner 201. A third subset of the data may have a setting 321 that encrypts the subset of data with the private key 206 and public key 207 pair (or some other key pair) associated with the DID owner 201. This type of data will require a party to have access to the public key 207 or to some other associated public key in order to decrypt the data. This process may also include authentication to the DID owner 201. A fourth subset of the data may have a setting 321 that restricts this data to a subset of third parties. This may require that public keys associated with the subset of third parties be used to decrypt the data. For example, the DID owner 201 may cause the setting 321 to specify that only public keys associated with friends of the DID owner 201 may decrypt this data.

In some embodiments, the identity hub 311 may have a permissions module 330 that allows the DID owner 201 to set specific authorization or permissions for third parties such as third parties 301 and 302 to access the identity hub. For example, the DID owner 201 may provide access permission to his or her spouse to all the data 320. Alternatively, the DID owner 201 may allow access to his or her doctor for any medical records. It will be appreciated that the DID owner 201 may permission to any number of third parties to access a subset of the data 320. This will be explained in more detail to follow.

In some embodiments, the identity hub 311 may include an attestation store 340 that includes various attestations 341, 342 and any number of additional attestations as illustrated by the ellipses 343 associated with the DID owner 201. An attestation may also be referred to as a credential or verified credential such as the credential 215 of the DID document 210. That is, the attestation or verified credential may provide information about the DID owner 201 and/or about various entities the DID owner 201 has interactions with. As mentioned previously, the attestations 340 may be (but are not limited to) a qualification, an achievement, a government ID, a government right such as a passport or a driver's license, a payment provider or bank account, a university degree or other educational history, employment status and history, or any other information about the DID owner 201's background. Accordingly, the attestations 340 may be used to verify the identity of the DID owner 201.

The identity hub 311 may also have a messaging module 345. In operation, the messaging module allows the identity hub to receive messages such as requests from parties such as third parties 301 and 302 to access the data and services of the identity hub. In addition, the messaging module 345 allows the identity hub 311 to respond to the messages from the third parties and to also communicate with a DID resolver 350. The DID resolver 350 may be a service, application, or module that is configured in operation to search the distributed ledger or blockchain 220 for DID documents associated with DIDs. Accordingly, in the embodiment the DID resolver 350 may search the distributed ledger or blockchain 220 using the DID 205, which may result in the DID resolver 350 finding the DID document 210. The ellipses 316 represent that the identity hub 311 may have additional services as circumstances warrant.

In one example embodiment, the DID owner 201 may provide the DID 205 to the third party entity 301 so that the third party may access data or services stored on the identity hub 311. Once the third party 301 has access to the DID 205, he or she may access the DID resolver 350 to access the DID document 210. As previously discussed, the DID document 210 may include an end point 213 that is an address or pointer to the identity hub 311. The third party 301 may then use the address or pointer to access the identity hub 311.

The third party 301 may send a message to the messaging module 345 asking for permission to access data in the identity hub 311. The messaging module 345 may then send a message to the DID owner 201 asking if the third party 301 should be given access to the data. Because the DID owner 201 desires to provide access to this data, the DID owner 201 may allow permission to the third party 301 and this permission may be recorded in the permissions 330.

The messaging module 345 may then message the third party 301 informing the third party that he or she is able to access the data. The identity hub 311 and the third party 301 may then directly communicate so that the third party may access the data. It will be noted that in many cases, it will actually be an identity hub associated with the third party 301 that communicates with the identity hub 311. However, it may be a device of the third party 301 that does the communication.

Advantageously, the above described process allows the identity hub 311 and the third party 301 to communicate and to share the data without the need for the third party to access the identity hub 311 in the conventional manner. Rather, the communication is provisioned in the decentralized manner using the DID 205 and the DID document 210. This advantageously allows the DID owner to be in full control of the process.

As shown in FIG. 3, the third party 302 may also request permission for access to the identity hub 311 using the DID 205 and the DID document 210. Accordingly, the embodiments disclosed herein allow access to any number of third parties to the identity hubs 310.

Figure 4:
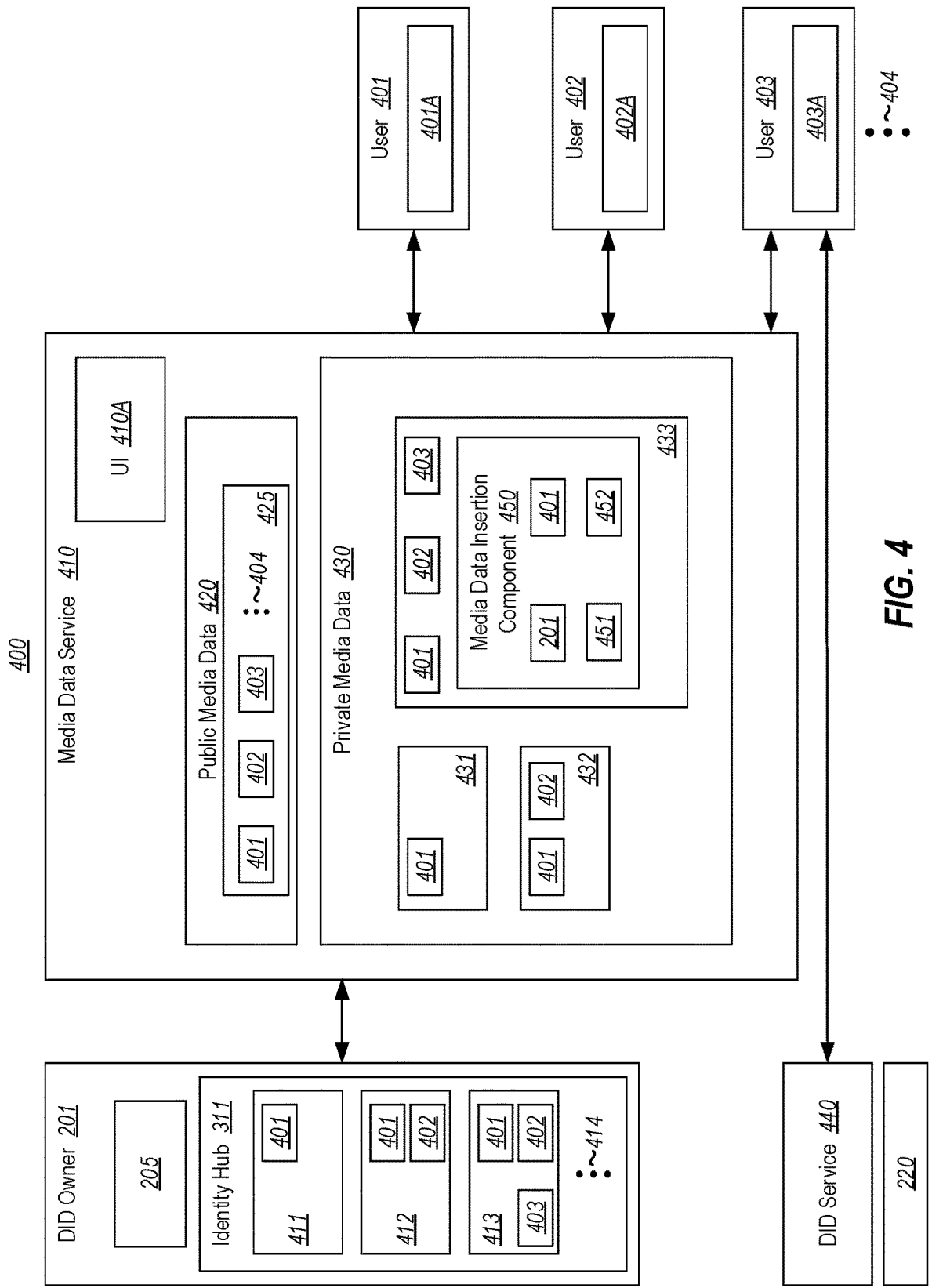
FIG. 4 illustrates an embodiment for inserting media data into existing media data.

FIG. 4 illustrates an embodiment of an environment 400 in which a DID such as DID 205 may be utilized. Specifically, the environment 400 will be used to describe the use of the DID 205 in relation to a media data service that allows for contextual review and insertion/deletion of various media as will explained in more detail to follow. It will be noted that FIG. 4 may include references to elements first discussed in relation to FIGS. 2-3 and thus use the same reference numeral for ease of explanation.

As illustrated, the environment 400 includes a media data service 410. In one embodiment, the media data service 410 may be implemented by a third party such as the provider of a DID management service 440 and/or the identity hubs 310. In some embodiments, the media data service 410 may be hosted on a server computer that is separate from any devices owned by the DID owner 201.

A specific use embodiment of the media data service 410 will now be explained, which will be followed by specific examples of the media data service 410. In one embodiment, the media data service 410 may be initiated by the DID owner 201 who has associated therewith the identity hub 311 as previously described. In addition, as previously described, the DID owner 201 may have control over the public and private key pair 206 and 207. Of course, in some alternative embodiments the media data service may be initiated by a third party other than the DID owner 201.

In the embodiment, the media data service 410 may allow the DID owner 201 to provide various types of media data to other users for various purposes as will be explained. The various types of media data that may be implemented on the media data service 410 includes, but is not limited to, chat media data, any type of written media data such as a book, a paper, an internet page or blog, audio media data, and video media data. Accordingly, the embodiments disclosed herein are not limited by the actual media data implemented on the media data service 410.

In the embodiment, the DID owner 201 may desire to provide the media data to a user 401, a user 402, and a user 403 using the media data service 410. As shown in FIG. 4, the user 401 may own or have control of a DID 401A and the user 402 may own or have control of a DID 402A. It will be noted that the DID 401A and the DID 402A are generated and stored on the distributed ledger or blockchain 220 in the manner previously described for the DID 205. Thus, the users 401 and 402 will also have a DID document associated with their respective DID and may also have one or more identity hubs that include attestations that may be used to verify the identity of the users 401 and 402. Accordingly, the DID documents and identity hubs associated with the users 401 and 402 may be similar to the DID document 210 and the identity hubs 310 previously described and thus do not need to be explained in further detail. It will also be noted that the user 403 does not initially have a DID that is associated with him or her.

As illustrated, the media data service 410 may include a public media data portion 420. The DID owner 201 may utilize the public media data portion 420 to provide media data 425 that is accessible to all users. Accordingly, the user 401, the user 402, and the user 403, along with any number of additional users as illustrated by the ellipses 404 may access the public media data 425. In some embodiments, however, access to the public media data 425 may require that a user own or have control of a DID.

In addition, the media data service 410 may include a private media data portion 430. The DID owner 201 may utilize the private media data portion 430 to provide private media data that may be private because it has been encrypted by the DID owner 201 using the public and private key pair 206 and 207 previously described. The private media data may only be accessible to users that own or control a DID and thus have a way to access the public key 207 of the DID owner 201 so that they may access the private media data.

For example, as previously described the identity hub 311 may have a permissions module 330 that allows the DID owner 201 to set specific authorization or permissions for the users 401-403. In the current embodiment, these permissions may allow the DID owner 201 to set a first permission 411 for a first portion of private media data 431, a second permission 412 for a second portion of private media data 432, and a third permission 413 for a third portion of private media data 433. It will be noted that the DID owner 201 may set any number of additional permissions as illustrated by the ellipses 414 for any additional portions (not illustrated) of private media data 430 included in the media data service 410. These permissions may be based on DIDs owned or controlled by the various users who utilize the media data service 410, thus ensuring that access to the private media data is controlled in a decentralized manner through use of the distributed ledger or blockchain 220.

In the embodiment, the user 401 may access the media data service 410. As previously described he or she may have access to the public media data 425 since all users may access that data. However, the user 401 may also desire access the private media data portion 430 so that he or she may access some of the private media data. In such case, the media data service 410 may utilize the DID 401A to access the DID resolver 350 to find the DID document associated with the DID 401A. This may then lead to an identity hub associated with the user 401, where the media data service 410 may be able to access one or more attestations so as to verify the identity of the user 401. If the media data service 410 is unable to verify the identity of the user 401, then the private media data may not be provided to the user 401.

If the identity is verified, the media data service 410 may access the permissions 411-414 stored in the identity hub 311 to determine if the user 401 should be allowed access to the private media data. In the current embodiment, the permission 411 may give the user 401 permission to access the private media data 431, the permission 412 may give the user 401 permission to access the private media data 432, and the permission 413 may give the user 401 permission to access the private media data 433. Of course, in some embodiments the step of verifying the identity of the user 401 using the attestations may be skipped and the media data service 410 may rely on only the permissions.

Since the user 401 owns or controls the DID 401A, the user 401 is part of the decentralized system anchored by the distributed ledger or blockchain 220. Accordingly, the user 401 may access the DID resolver 350 to search the distributed ledger or blockchain 220 using the DID 205, which may result in the DID resolver 350 finding the DID document 210. The DID document 210 may then be used to access the public key 207, either from the DID document or from the identity hub 311 in the manner previously described.

The user 401 may then be able to use the public key 207 (or some other key associated with the DID owner 201) to decrypt the private media data 430. That is, the media data service 410 may access the private data 431 from the identity hub 311 (or some other source) and then make it available to the user 401, who is able to decrypt and access the private media data 431. In some embodiments, the private media data 431 may be decrypted at the rendering level as it is rendered in a UI 410A associated with the media data service 410.

As mentioned previously, the user 401 may also be given permission to access the private media data 432 and 433. Accordingly, the media data service 410 may provide the private media data 432 and 433 to the user 401. The user 401 may be able to decrypt the private media data 432 and 433 at the rendering level in the manner previously described.

Likewise, the user 402 may access the media data service 410. As previously described he or she may have access to the public media data 425 since all users may access that data. However, the user 402 may also desire access the private media data portion 430 so that he or she may access some of the private media data. In such case, the media data service 410 may then utilize the DID 402A to access the DID resolver 350 to find the DID document associated with the DID 402A. This may then lead to an identity hub associated with the user 402, where the media data service 410 may be able to access one or more attestations so as to verify the identity of the user 402. Of course, in some embodiments the step of verifying the identity of the user 402 using the attestations may be skipped and the media data service 410 may rely on only the permissions.

Once the identity is verified, the media data service 410 may access the permissions 411-414 stored in the identity hub 311 to determine if the user 402 should be allowed access to the private media data. In the current embodiment, the permission 412 may give the user 402 permission to access the private media data 432 and the permission 413 may give the user 402 permission to access the private media data 433. Of course, in some embodiments the step of verifying the identity of the user 402 using the attestations may be skipped and the media data service 410 may rely only on the permissions.

Since the user 402 owns or controls the DID 401A, the user 402 is also part of the decentralized system anchored by the distributed ledger or blockchain 220. Accordingly, the user 402 may access the DID resolver 350 to search the distributed ledger or blockchain 220 using the DID 205, which may result in the DID resolver 350 finding the DID document 210. The DID document 210 may then be used to access the public key 207, either from the DID document or from the identity hub 311 in the manner previously described.

The user 402 may then be able to use the public key 207 (or some other key associated with the DID owner 201) to decrypt the private media data 430. That is, the media data service 410 may access the private data 432 from the identity hub 311 (or some other source) and then make it available to the user 402, who is able to decrypt and access the data 432. In like manner, the user 402 may also be given access to the private media data 433, which he or she may be able to decrypt in the manner previously described.

In the embodiment, the user 403 may also access the media data service 410 to gain access some of the private media data. In this case, however, the media data service 410 may determine that the user 403 does not yet own or have control of a DID. Accordingly, the media data service 410 may prompt the user 403 to access the DID service 440, which is a service typically owned by a third party that is able to generate DIDs for users. The DID service 440 may generate a DID 403A that is backed by the distributed ledger or blockchain 220 in the manner previously described. Accordingly, the embodiments disclosed herein contemplate that users who do not have a DID being able to obtain a DID to fully utilize the media data service 410.

The media data service 410 may then access the permissions 411-414 and determine that the user 403 should be allowed access to the private media data 433. The user 403 may then access the DID resolver 350 to search the distributed ledger or blockchain 220 to access the public key 207 in the manner previously described. The private media data 403 may then be decrypted using the public key 207 as previously described. It will be appreciated that the user 403 is unlikely to have accumulated any attestations as the DID 403A is new and so this step may be skipped as the media data service 410 may be able to determine the identity of the user 403 since the user just created the DID 403A.

In some embodiments, the media data service 410 may include a media data insertion component 450. The media data insertion component 450 may allow the DID owner 201 and one or more of the users 401-403 to insert media data into the media data service 410 that is not to be accessible or viewable to the other users. In some embodiments, the media data insertion component 450 may allow two or more of the users 401-403 to insert media data into the media data service 410 that is not be accessible or viewable by the DID owner 201 and the other users.

For example, as shown in FIG. 4 the media data insertion component 450 may allow the DID owner 201 to insert media data 451 that that is only accessible or viewable by the user 401. Likewise, the user 401 may be able to insert media 452 that is only accessible or viewable by the DID owner 201. However, as also shown in FIG. 4, the users 402 and 403, although being able to access the private media data 433, are not able to access or view the media data 451 and 452 that has been inserted into the private media data 433 via the media data insertion component 450 by the DID owner 201 and the user 401. Accordingly, the DID owner 201 and the user 401 constitute a subset of the users who can access the private media data 433. For instance, if the media data 451 and 452 were chat data, then only the DID owner 201 and the user 401 would be able to view the particular chat data that was inserted by either the DID owner 201 and the user 401. Examples of the media data insertion component 450 will follow in more detail.

Figure 5A:
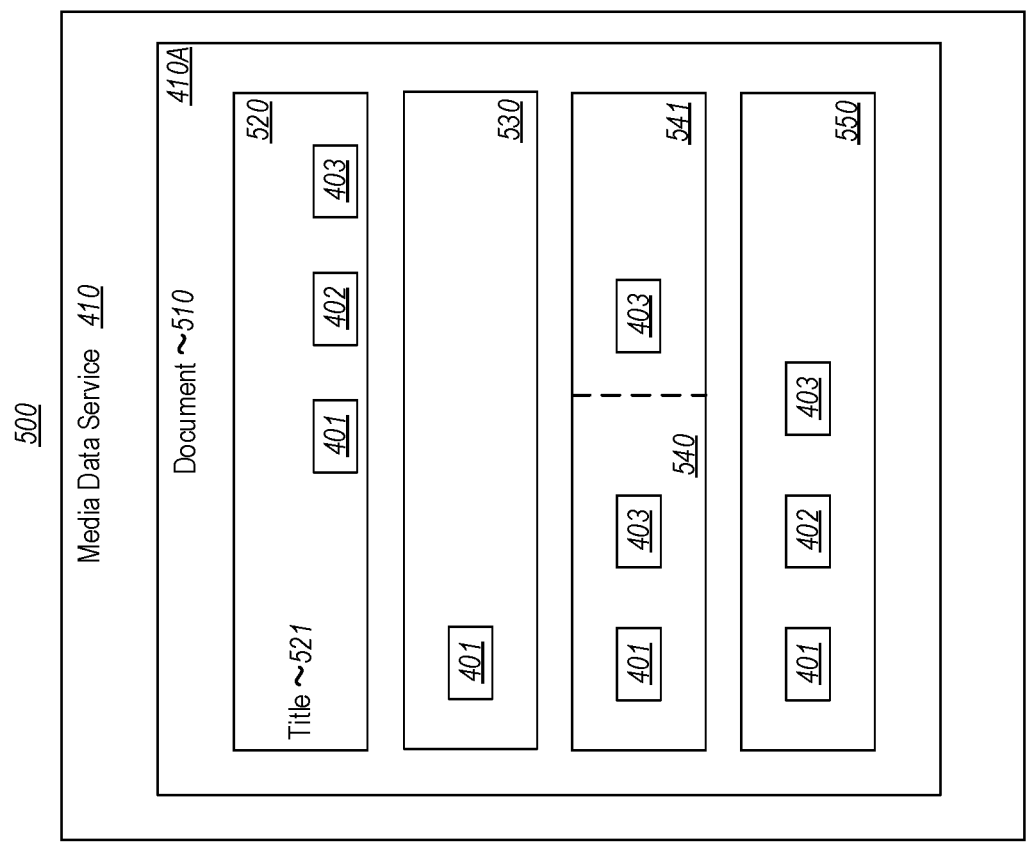
FIGS. 5A and 5B illustrate examples of the embodiment of FIG. 4.

FIG. 5A illustrates a use embodiment of the media data service 410. Accordingly, for ease of explanation not all of the details from FIG. 4 will be repeated in FIG. 5A. As illustrated, the media data service 410 and it corresponding UI 410A are used show media data that may be a book, article, blog post or any other type of written document 510 that that DID owner 201 (or some other user) desires to have edited by various users. However, in order to ensure that none of the editing users are able to access the entire document, which could lead to the document 510 being copied or leaked, the DID owner 201 may only allow certain parts of the document to be accessible by different users.

For example, a public media data portion 520 of the document that includes a title 521 may be accessible or viewable by all the editing users. Accordingly, the public media data portion 520 may correspond to the public media data 420 previously discussed. As shown in the figure, the users 401, 402, and 403 may have access to the portion 520 without the need for any DID based permissions.

As further illustrated in FIG. 5A, the document 510 may include private media data portions 530, 540, and 550. These portions of the document 510 may be various paragraphs or chapters that are to be edited. Accordingly, these portions may correspond to the private media data 430 previously discussed.

As shown in FIG. 5A, the user 401 has been given permission to access and therefore review the private media data portion 530 of the document 510. As previously described in relation to the FIG. 4, the identity of the user 401 may be verified and the user 401 may access the public key 207 of the DID owner 201 and may then use the public key to decrypt the private media data portion 530. The user 401 may then review the private media data portion 530 and make edits to the data as needed.

As also shown in FIG. 5A, both the users 401 and 403 have been given permission to access and therefore review the private media data portion 540 of the document 510. As previously described in relation to the FIG. 4, the users 401 and 403 may access the public key 207 of the DID owner 201 and may then use the public key to decrypt the private media data portion 540. The users 401 and 403 may then review the private media data portion 540 and may make edits to the data as needed.

In the embodiment, the user 403 may make some edits 541 to the private media data 540 that are meant to only be viewable by the DID owner 201. The edits 541 may be corrections or additions to what is already been written that are of a nature that it is not desirable that the user 401 see the contents of the edits. Accordingly, the user 403 may access the media data insertion component 450 to insert the edits 541 into the private media data 540. The user 403 may then use his or her private and public key pair associated with the DID 403A to encrypt the edits 541. The DID owner 201 may access the distributed ledger or blockchain 220 to obtain the public key associated with the DID 403A to decrypt the edits 541 as needed. In this way, only the DID owner 201 is aware of the edits 541 and is able to decrypt them as needed.

As further shown in FIG. 5A, all of the users 401, 402, and 403 have been given permission to access and therefore review the private media data portion 550 of the document 510. These users may access the distributed ledger or blockchain 220 to obtain the needed public key to decrypt the private media data portion 550 in the manner previously described. In addition, their identities may be verified using the distributed ledger or blockchain 220 in the manner previously described. The users 401, 402, and 403 may then review the private media data portion 540 and may make edits to the data as needed. Although not illustrated, any of the user may utilize the media data insertion component 450 to insert edits that are only to be viewed by a smaller number of users than have access to the private media data portion 550.

Figure 5B:
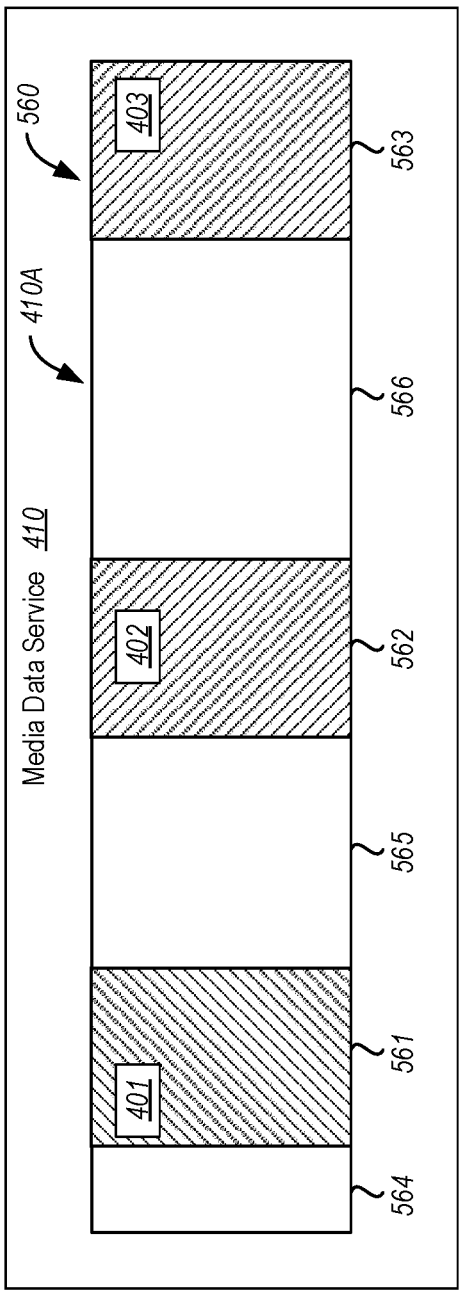

FIG. 5B illustrates an alternative use embodiment of the media data service 410. As illustrated in FIG. 5B, the media data in this embodiment may be streaming media data 560 such as audio data, video data, or some other type of media data that is able to be streamed by a user. The streaming media data 560 may be shown on the UI 410A of the media data service 410.

As shown in FIG. 5B, the streaming media data 560 may include various portions 561-566 that may correspond to different time periods within the streaming of the data. For example, portions 564, 565, and 566 may correspond to time periods of the streaming data that are not accessible to any user except the DID owner 201 (or some other user who owns the streaming data 560).

As illustrated, a portion 561 may correspond to a time period of the streaming data 560 that the user 401 has been given access to. The user 401 may access the distributed ledger or blockchain 220 to gain access this portion of the stream in the manner previously described. The user 401 may then review and edit this portion as needed.

Likewise, a portion 562 may correspond to a time period of the streaming data 560 that the user 402 has been given access to and the portion 563 may correspond to a time period of the streaming data 560 that the user 403 has been given access to. The users 402 and 403 may access the distributed ledger or blockchain 220 to gain access theses portions of the data stream respectively in the manner previously described. The users 402 and 403 may then review and edit the respective portions as needed.

FIG. 6A-6D illustrates an alternative use embodiment of the media data service 410. In the embodiment of FIGS. 6A-6D, the media data is chat data. The figures illustrate the use of the UI 410A in implementing the chat in a decentralized manner. As with the use embodiments of FIGS. 5A and 5B, elements of FIG. 4 previously described will be omitted for ease of explanation.

As shown in FIG. 6A, the UI 410A may include an identifier portion 610 that identifies the media as chat media data. The UI may also include an element 615 that shows the users who are actively using the block chat. For example, element 615 shows that DID owner 201 and users 401-403 are communicating using the block chat 610. In some embodiments, the icons for the various users of the block chat may be different colors, shapes, or other unique identifier so that each user may be easily recognized in the block chat. The element 615 may be an example of public media data 420 or it may be part of the private media data 430. Accordingly, not all embodiments disclosed herein require a public media data portion.

FIG. 6A also shows a private media data portion 620 that may correspond to the private media data portion 430. The private media data portion 620 includes a first chat block 621 that has been generated by the DID owner 201. As shown, the chat block 621 recites "Then we will tighten the screws with a hammer." The private media data portion 620 includes also includes a second chat block 622 that has been generated by the user 401. The chat block 622 recites "Great Idea. That will save us money as there is no need to buy a screwdriver." It will be noted that the DID owner 201 and the user 401 are able to generate their respective chat blocks in the decentralized manner previously discussed in relation to FIG. 4. That is, the media data service 410 utilizes the distributed ledger or blockchain 220 and the DIDs 205 and 401A of the DID owner 201 and the user 401 to grant permission to include the chat blocks.

FIG. 6A further shows a user input element 630 that allows the user 402 to insert data into the block chat in a private manner. Accordingly, the user input element 630 may correspond to the media data insertion component 450 and will be explained in more detail to follow.

Figure 6B:
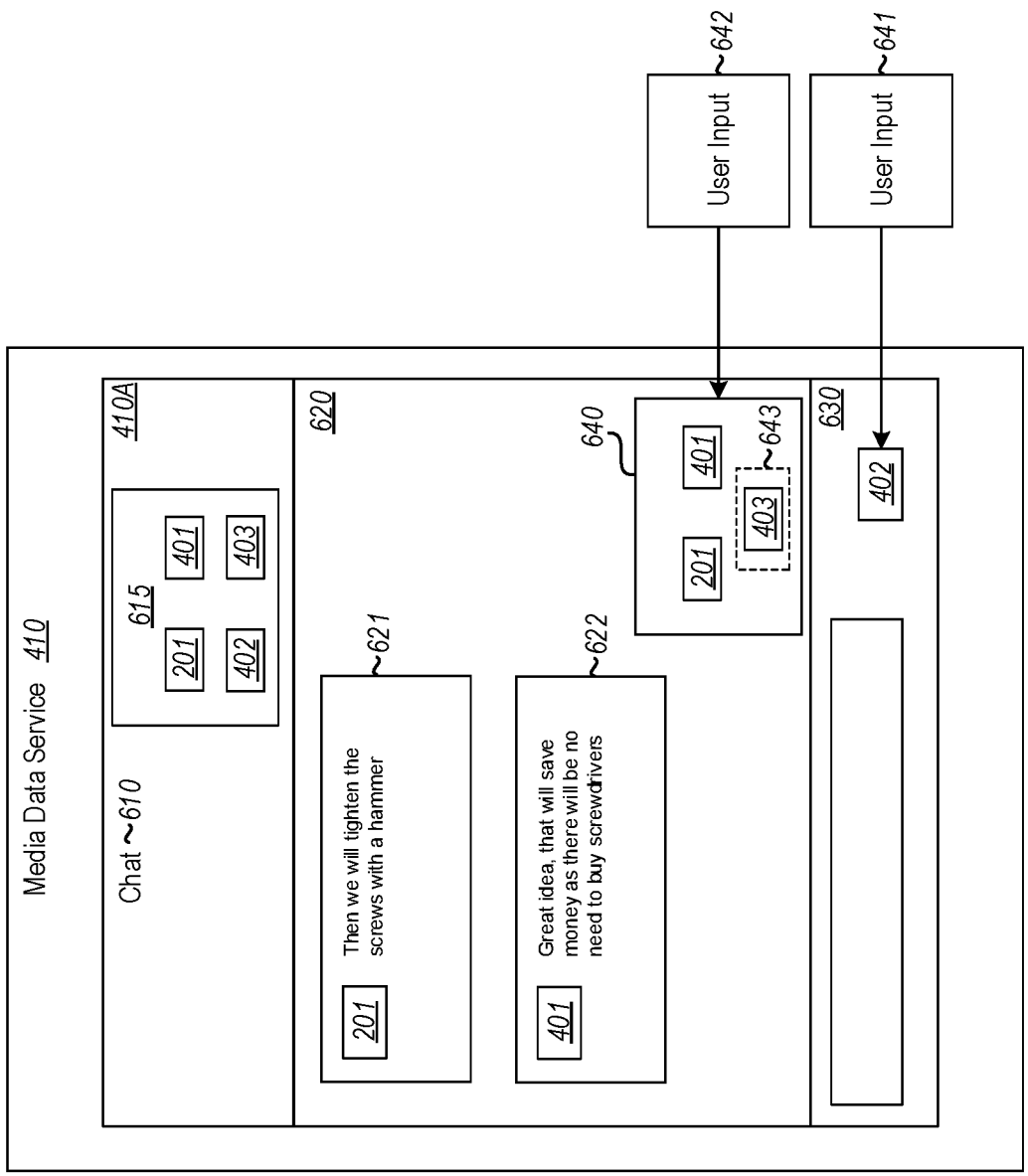

FIG. 6B shows the operation of the user input element 630. Suppose, for example, that the user 402 did not agree that using a hammer to tighten the screws is a good idea. However, the user 402 may not want to publicly express this view so that is seen by the DID owner 201 and/or the user 401 so as to not embarrass or make angry the DID owner 201 and/or the user 401. Accordingly, the user 402 may provide user input 641 into the user input element 630. In the illustrated embodiment, this may result in an element 640 appearing in the UI 410A that lists all of the other users besides the user 402 who the user 402 may want to have a private communication with. In the embodiment, the user 402 may provide user input 642 that selects the user 403 as illustrated by the dashed line 643. The dashed line represents that the selected user may be denoted by a different color, size, or other unique identifier.

Figure 6C:
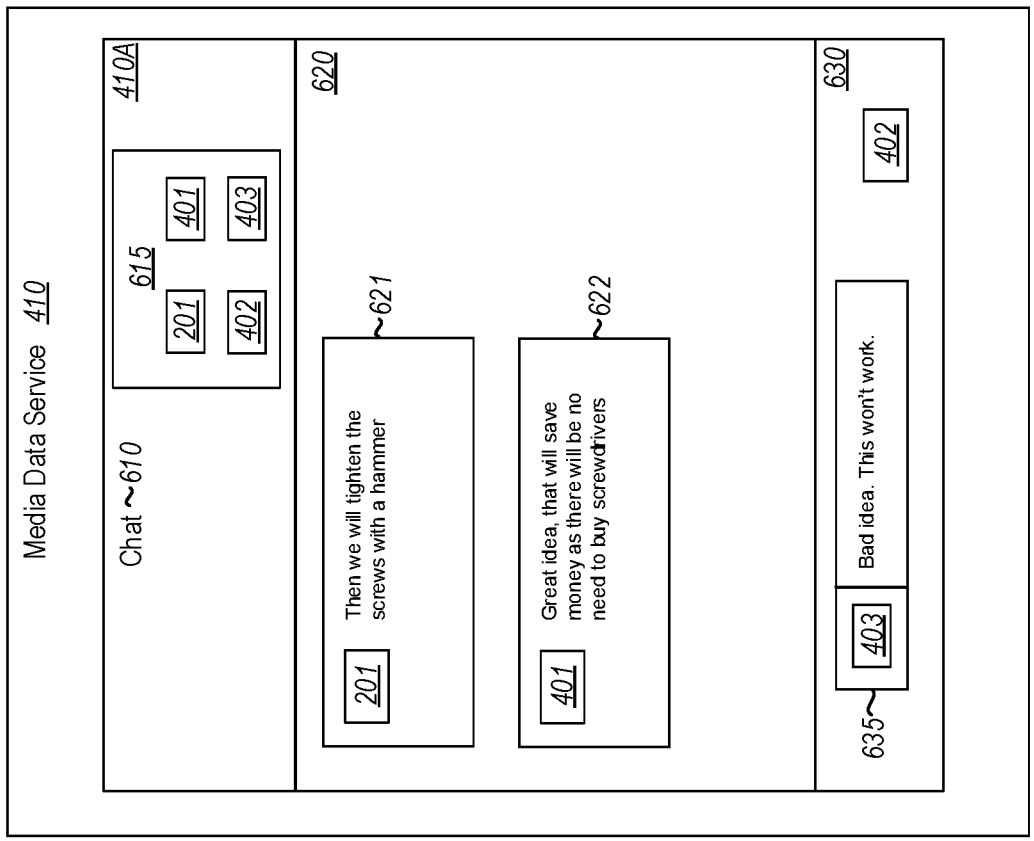

FIG. 6C further shows the operation of the user input element 630. As illustrated, the user 402 is able to enter "Bad idea. Will not work" as he or she may not believe that a hammer can effectively tighten a screw. The figure also shows at 635 that, as previously explained, the distributed ledger or blockchain 220 will be accessed so that the user 403 is able to receive the private message from the user 402.

Figure 6D:
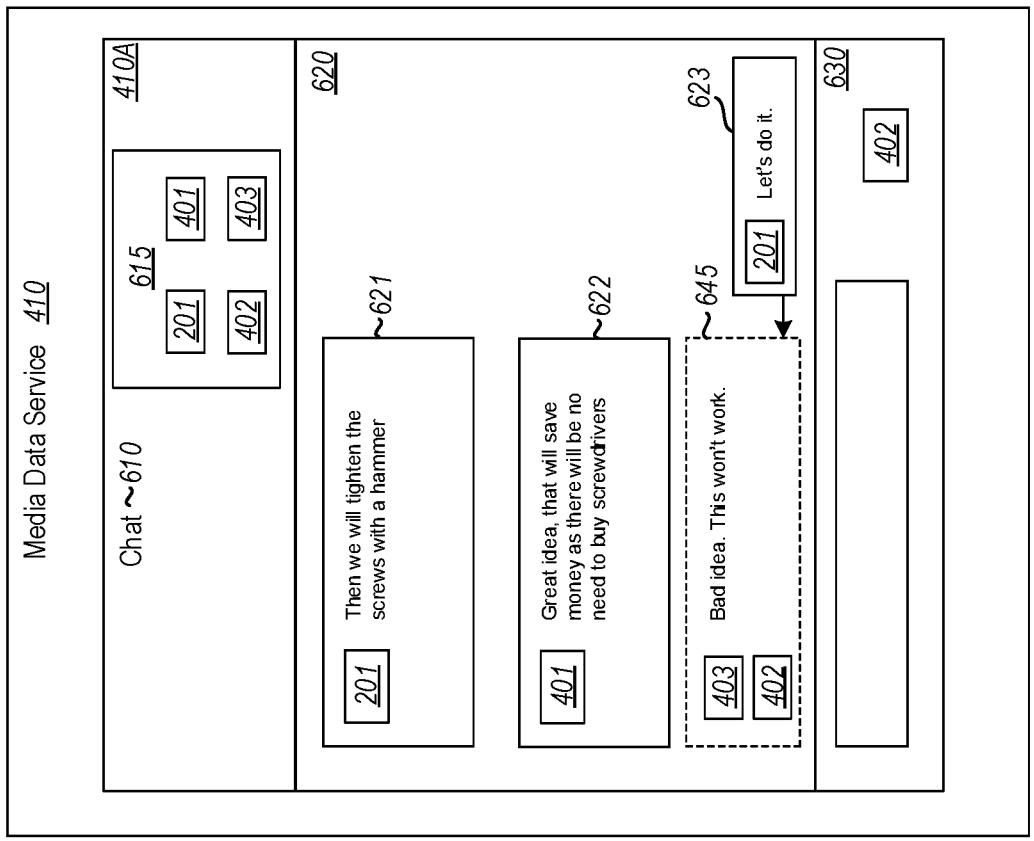

FIG. 6D shows that the private chat block 645 from the user 402 has been inserted into the block chat. The dashed lines surrounding the private message 645 illustrate that only the user 402 and 403 are able to see the inserted private message 645. Advantageously, the inserted private chat block 645 has been placed in the UI 410A in-line with the previous chat messages 621 and 622. Thus, the users 402 and 403 need not open any other UI to view this message. This may add to the readability of the inserted private chat block 645 and thus add to user comfort. It will be noted that the user 402 is able to insert the private chat block 645 in the decentralized manner previously described in relation to FIG. 4. That is, the media data service 410 may utilize the distributed ledger or blockchain 220 and the DID 402A to grant permission to include the private me In addition, the private chat block 645 may remain in-line even when additional chat messages are added. For example, FIG. 6D shows that a chat message 623 generated by the DID owner 201 that recites "Let's do it" has been added subsequent to the private message 645. However, the private chat block 645 remains in-line in its chronological order, which may also add to the readability of the inserted private chat block 645.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
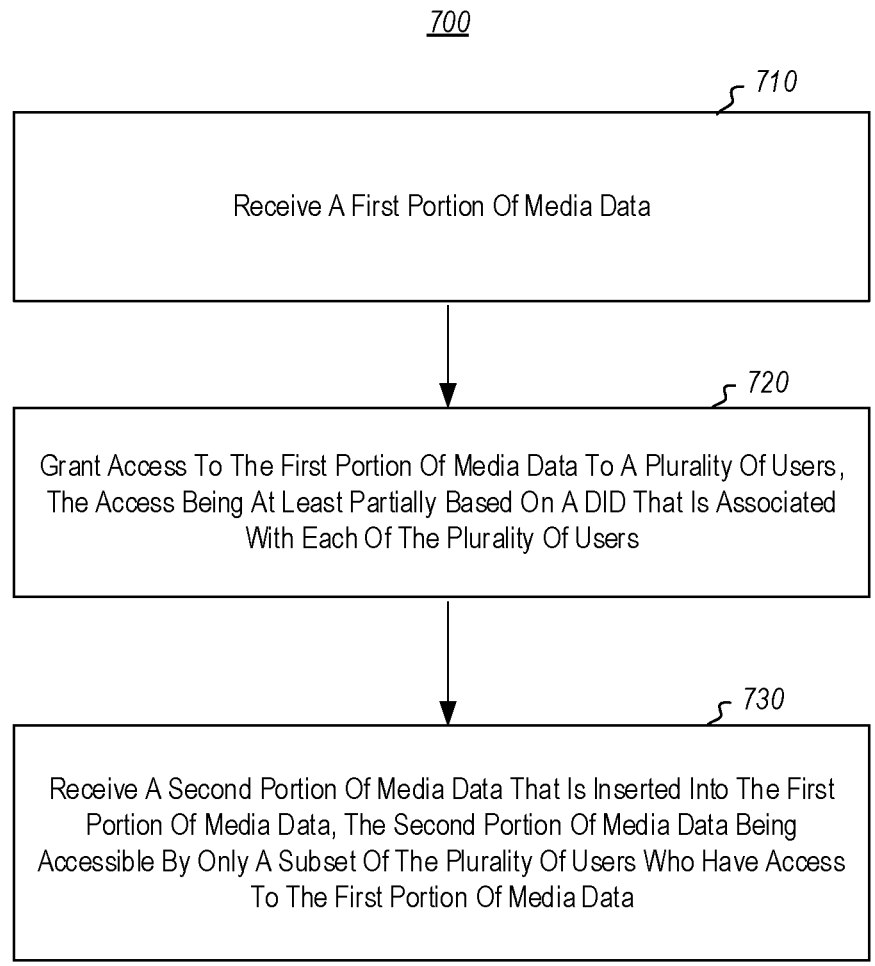
FIG. 7 illustrates a flow chart of an example method for inserting media data into existing media data in a way that ensures the inserted data is not accessible to all users.

FIG. 7 illustrates a flow chart of an example method 700 for inserting media data into existing media data in a way that ensures the inserted data is not accessible to all users. The method 700 will be described with respect to one or more of FIGS. 2-6 discussed previously.

The method 700 includes receiving a first portion of media data (710). For example, as previously discussed, first media data such as private media data 430 (431, 432, 433), 530, 540, 550, 561-563, 620, 621, and 622 may be received by the media data service 410. The first portion of media data may be chat data, a document such as a book, an article, a blog post, an internet page, or streaming audio or video data.

The method 700 includes granting access to the first portion of media data to a plurality of users (720). The access being at least partially based on a DID that is associated with each of the plurality of users. For example, as previously described the DID owner 201 and the users 401-403 may be granted access to the first portion of media data. As previously described primarily in relation to FIGS. 2-4, the media data service utilizes one or more of the DIDs 205, 401A, 402A and 403A to access the distributed ledger or blockchain 220 to verify the identities of the users as needed. The users may also use one or more the DIDs to obtain a public key that allows the user to decrypt the first portion of media data.

The method 700 includes receiving a second portion of media data that is inserted into the first portion of media data (730). The second portion of media data is accessible by only a subset of the plurality of users who have access to the first portion of media data. The access to the second portion of media data is also at least partially based on the DID of each of the subset of users.

For example, as previously described a second portion of media data such as media data 451, 452, 541, and 645 may be inserted by the media data insertion component 450. This data is accessible by less than all of the DID owner 201 and the users 401-403 as previously described. The media data service 410 and the media data insertion component 450 utilize one or more of the DIDs 205, 401A, 402A and 403A to allow the media data insertion component 450 to insert the second media data in the manner previously described.

Figure 8:
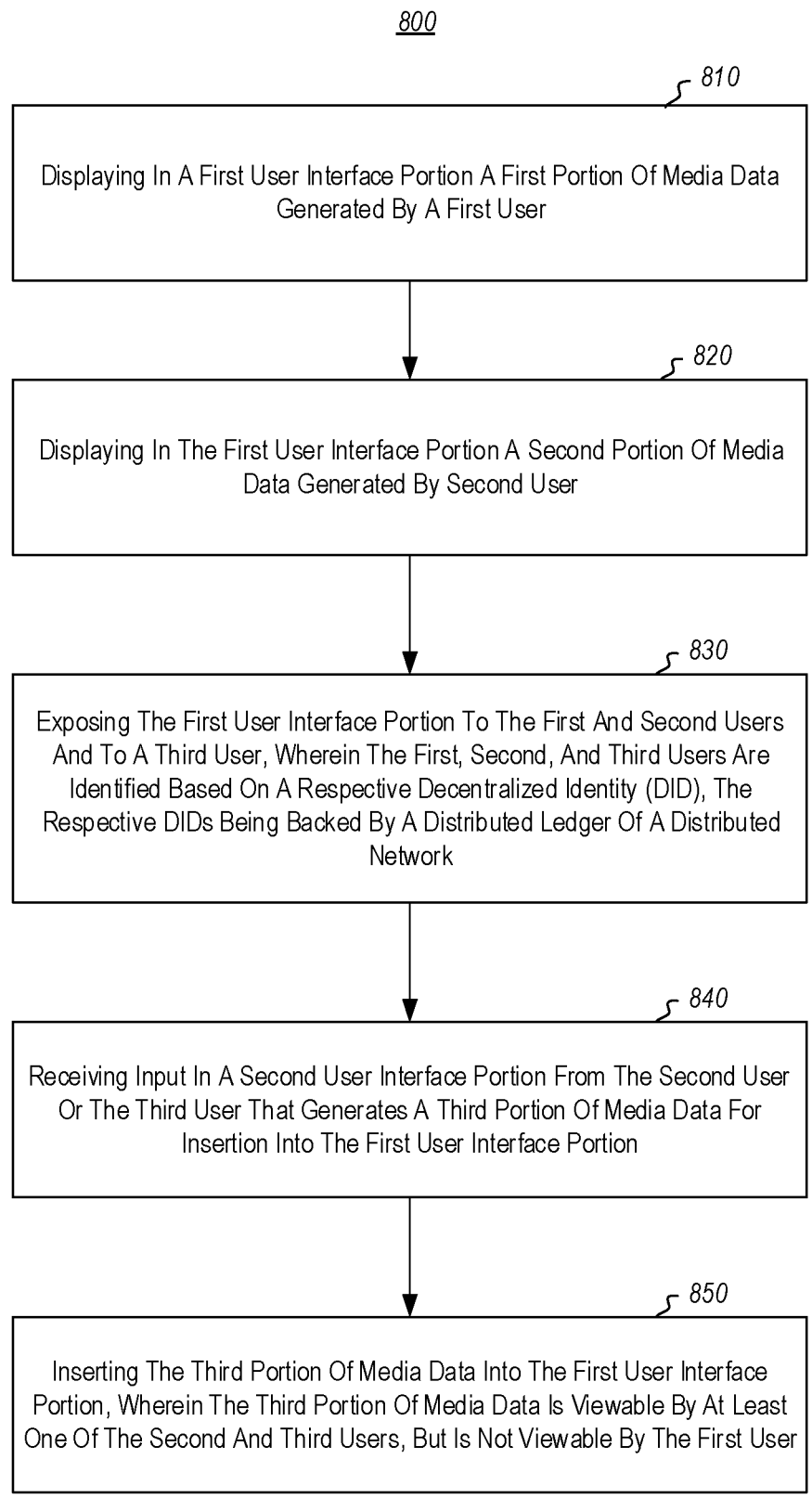
FIG. 8 illustrates a flow chart of an alternative example method for inserting media data into existing media data in a way that ensures the inserted data is not accessible to all users.

FIG. 8 illustrates a flow chart of an example method 800 for inserting media data into existing media data in a way that ensures the inserted data is not accessible to all users. The method 800 will be described with respect to one or more of FIGS. 2-6 discussed previously.

The method 800 includes displaying in a first user interface portion a first portion of media data generated by a first user (810). For example, as previously described the DID owner 210 may generate the chat block 621 in the user interface portion 620.

The method 800 includes displaying in the first user interface portion a second portion of media data generated by second user (820). For example, as previously described the user 401 may generate the chat block 622 in the user interface portion 620.

The method 800 includes exposing the first interface portion to the first and second users and to a third user (830). The first, second, and third users are identified based on a respective decentralized identity (DID), the respective DIDs being backed by a distributed ledger of a distributed network. For example, the DID owner 201 and the users 401-403 are exposed to the user interface portion 620. The DIDs of each of the users may be utilized to identify the various users in the manner previously described.

The method 800 includes receiving input in a second user interface portion from the second user or the third user that generates a third portion of media data for insertion into the first user interface portion (840). For example, as previously described the user 402 may use the user interface portion 630, which may correspond to the media data insertion component 450, to generate the private block chat 645.

The method 800 includes inserting the third portion of media data into the first user interface portion (850). The third portion of media data is viewable by the second and third users, but is not viewable by the first user. For example, as previously described the private chat block 645 is inserted into the user interface portion 620. However, only the user 402 and the user 403 are able to view the private chat block 645. The DID owner 201 and the user 401 are not able to view the private chat block. As shown, the private chat block may be placed in-line so that the users 402 and 403 need not use another UI to view the private chat block.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for inserting media data into existing media data in a way that ensures the inserted media data is not accessible to all users, the computing system comprising:
   one or more hardware processors; and
   one or more computer-readable media having thereon computer-executable instructions that are structured to, when executed by the one or more processors, configure the computing system to:
   receive a first portion of media data;
   grant access to the first portion of media data to a plurality of users, the access being at least partially based on a decentralized identifier (DID) that is associated with each of the plurality of users; and
   receive a second portion of media data that is inserted into the first portion of media data, the second portion of media data being accessible by only a subset of the plurality of users who have access to the first portion of media data, wherein access to the second portion of media data is also at least partially based on the DID of each of the subset of users,
   wherein the computing system is implemented in a decentralized network that implements a distributed ledger, the distributed ledger configured to back one or more decentralized identifiers (DID) for the plurality of users.

2. The computing system of claim 1, wherein the access to the first portion of media data is further based on a set of permissions that are associated with the DID of an owner of the first portion of media data.

3. The computing system of claim 1, wherein the second portion of media data is placed in-line with the first portion of media data in a User Interface (UI) where the first and second portions of media data are rendered.

4. The computing system of claim 1, wherein the DID that is associated with each of the plurality of users allows each of the plurality of users to access a public key via the decentralized network, the public key being used to decrypt the first portion of media data at a rendering level.

5. The computing system of claim 1, the one or more hardware processors executing the computer-executable instructions to further configure the computer system to: receive a third portion of media data, the third portion of media data being accessible to one or more additional users who do not have access to a DID.

6. The computing system of claim 1, wherein the first and second media data comprises chat media data.

7. The computing system of claim 1, wherein the first and second media data comprises one of a written document, a book, an article, a blog post, or an internet page.

8. The computing system of claim 1, wherein the first and second media data comprises one or more of streaming audio data or streaming video data.

9. A method for inserting media data into existing media data in a way that ensures the inserted media data is not accessible to all users, the method comprising:
   receiving a first portion of media data;
   granting access to the first portion of media data to a plurality of users, the access being at least partially based on a decentralized identifier (DID) that is associated with each of the plurality of users; and
   receiving a second portion of media data that is inserted into the first portion of media data, the second portion of media data being accessible by only a subset of the plurality of users who have access to the first portion of media data, wherein access to the second portion of media data is also at least partially based on the DID of each of the subset of users,
   wherein the method is performed in a computing system that is implemented in a decentralized network that implements a distributed ledger, the distributed ledger configured to back one or more decentralized identifiers (DID) for the plurality of users.

10. The method of claim 9, wherein the access to the first portion of media data is further based on a set of permissions that are associated with the DID of an owner of the first portion of media data.

11. The method of claim 9, wherein the second portion of media data is placed in-line with the first portion of media data in a User Interface (UI) where the first and second portions of media data are rendered.

12. The method of claim 9, wherein the DID that is associated with each of the plurality of users allows each of the plurality of users to access a public key via the decentralized network, the public key being used to decrypt the first portion of media data at a rendering level.

13. The method of claim 9, further comprising:
   receiving a third portion of media data, the third portion of media data being accessible to one or more additional users who do not have access to a DID.

14. The method of claim 9, wherein the first and second media data comprises chat media data.

15. The method of claim 9, wherein the first and second media data comprises one of a written document, a book, an article, a blog post, or an internet page.

16. The method of claim 9, wherein the first and second media data comprises one or more of streaming audio data or streaming video data.

* * * * *